(12) United States Patent
Gulrez et al.

(10) Patent No.: US 9,946,350 B2
(45) Date of Patent: Apr. 17, 2018

(54) CUTANEOUS HAPTIC FEEDBACK SYSTEM AND METHODS OF USE

(71) Applicant: QATAR UNIVERSITY, Doha (QA)

(72) Inventors: Tauseef Gulrez, Dulwich Hill (AU); Woon Jong Yoon, Bothwell, WA (US)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 14/956,135

(22) Filed: Dec. 1, 2015

(65) Prior Publication Data

US 2017/0024978 A1 Jan. 26, 2017

Related U.S. Application Data

(60) Provisional application No. 62/085,874, filed on Dec. 1, 2014.

(51) Int. Cl.
*H04B 3/36* (2006.01)
*G06F 3/01* (2006.01)

(52) U.S. Cl.
CPC .................................. *G06F 3/016* (2013.01)

(58) Field of Classification Search
CPC .................................. G08B 6/00; G06F 3/016
USPC ............. 340/407.1; 345/156, 168, 173, 174; 700/264; 701/70; 715/702
See application file for complete search history.

(56) References Cited

U.S. PATENT DOCUMENTS

| | | | |
|---|---|---|---|
| 6,985,133 B1 * | 1/2006 | Rodomista | G06F 3/016 345/156 |
| 7,236,157 B2 | 6/2007 | Schena et al. | |
| 7,778,733 B2 | 8/2010 | Nowlin et al. | |
| 7,831,292 B2 | 11/2010 | Quaid et al. | |
| 8,504,205 B2 | 8/2013 | Summer et al. | |
| 8,523,043 B2 | 9/2013 | Ullrich et al. | |
| 8,619,031 B2 | 12/2013 | Hayward | |
| 8,638,057 B2 | 1/2014 | Goldberg et al. | |
| 8,994,643 B2 * | 3/2015 | Massie | G06F 1/206 345/156 |
| 2005/0245910 A1 | 11/2005 | Wright et al. | |
| 2006/0209019 A1 * | 9/2006 | Hu | G06F 3/016 345/156 |

(Continued)

FOREIGN PATENT DOCUMENTS

WO 2013/187977 A1 12/2013

OTHER PUBLICATIONS

Anonymous, "Application of Biomedical Engineering in Force and Tactile Sensing for Robotic MIS," Force and Tactile Sensing in Robotics, Accessed Jul. 2, 2014 6:29:21 PM: http://bme240.eng.uci.edu/students/10s/sgupta1/ForceTactileSensing.html.

(Continued)

*Primary Examiner* — Dhaval Patel
(74) *Attorney, Agent, or Firm* — Squire Patton Boggs (US) LLP

(57) ABSTRACT

Systems and methods may utilize cutaneous feedback for enhanced control of various types of manipulandum. Embodiments of the present invention may include a haptic feedback system comprising: an actuator that exerts force to a user when engaging the actuator that provides cutaneous feedback to the user when using the system. The systems and methods may allow for adjustable and customizable operation of the system to improve the relationship between human and mechanical or virtual devices.

19 Claims, 16 Drawing Sheets

(56) References Cited

U.S. PATENT DOCUMENTS

| | | | |
|---|---|---|---|
| 2007/0032701 A1* | 2/2007 | Fowler | A61B 1/00149 600/173 |
| 2007/0270685 A1 | 11/2007 | Kang et al. | |
| 2009/0000627 A1 | 1/2009 | Quaid et al. | |
| 2011/0032090 A1* | 2/2011 | Provancher | G06F 3/016 340/407.1 |
| 2011/0290856 A1 | 12/2011 | Shelton et al. | |
| 2012/0038468 A1 | 2/2012 | Provancher | |
| 2014/0005682 A1 | 1/2014 | Worrell et al. | |
| 2014/0336452 A1* | 11/2014 | Shahoian | A61H 19/30 600/38 |
| 2015/0035658 A1* | 2/2015 | Provancher | G08B 6/00 340/407.1 |

OTHER PUBLICATIONS

Anonymous, "TOUCHaptics—What is Haptics?" Accessed: Jul. 2, 2014 6:28:14 PM: http://neilforrest.zxq.net/what_is_haptics.php.

Kron, Alexander, "Multi-fingered Tactile Feedback from Virtual and Remote Environments," Proceedings of the11th Symposium on Haptic Interfaces for Virtual Environment and Teleoperator Systems, 2003, 8 pages.

Okamura, Allison M., "Haptic Feedback in Robot-Assisted Minimally Invasive Surgery," Curr Opin Urol., Jan. 2009, 19(1): pp. 102-107.

Yao, Hsin-yun, "A tactile enhancement instrument for minimally invasive surgery".

* cited by examiner

CUTANEOUS HAPTIC FEEDBACK SYSTEM AND METHODS OF USE

CROSS REFERENCE TO RELATED APPLICATIONS

The present application is related to and claims the benefit and priority of U.S. Provisional Patent Application No. 62/085,874, filed Dec. 1, 2014, the entirety of which is hereby incorporated herein by reference.

FIELD OF THE INVENTION

The present application relates to a cutaneous haptic feedback system and methods of using the system.

BACKGROUND OF THE INVENTION

Interaction between humans and machines is improved when the user has an increased intuitive understanding of how the machine is operating. In general, tactile (haptic) feedback is responsible for the detection of, but not limited to, roughness, temperature, and/or vibrations. Haptic, or tactile, technology recreates the sense of touch by applying forces, vibrations, or motions to the user. This mechanical stimulation can be used to assist in the creation of virtual objects in a computer simulation, to control virtual objects, and to enhance the remote control of machines and devices.

The field of surgery provides a common scenario where a human is controlling a mechanical device requiring care and dexterity. In a robotic surgery scenario, a surgeon often holds an object of interest through robotic grippers, for example. Without any type of haptic feedback, a surgeon has a reduced understanding of the force being imparted onto object to hold, to avoid damaging the object. Current MIS and medical systems have limited ability to provide force feedback to a surgeon while performing teleoperated surgical tasks. Surgeons are at a disadvantage due to the lack of haptic (tactile) feedback and may be unable to reduce tissue damage during surgeries and diagnostics. Tissue damage often occurs due to the application of excessive force during tissue holding or inappropriate suturing.

Auditory, visual, shear, and vibration feedback have been used to translate force information in teleoperated robotic MIS in research literature. Research studies on robotic surgeries have shown that alternative sensory information can enhance surgeon's performance in teleoperated tasks as compared to the performance with no haptic feedback.

Frequently, a user of robotic or other types of mechanical devices is controlling the device through the use of a stylus, controller, or remote. In particular applications, the user may utilize fingertips to engage the controls of the stylus, controller, or remote. Fingertips can be a good appendage with which to utilize cutaneous feedback since the fingertip skin is replete with mechanoreceptors. The mechanism of providing the information by these receptors to the brain is known as "cutaneous feedback." Cutaneous-type haptic feedback has been utilized in earlier research for the evaluation of peg-insertion task performance using robotic grippers. But previous uses of cutaneous feedback have failed to provide adequate results.

Vibrating actuators have been used to create cutaneous feedback. These systems induce vibrations on the fingertip skin. Vibrating actuators or vibrotactile sensors do not provide the lack of feedback regarding directional information. Vibrating actuators can only display frequency of a given signal, and thus, are limited in the ability to convey relative and dynamic changes in the operation of the device to the user.

Pin-type haptic feedback has also been used. For example, binary structures have been used as types of pin devices but these binary structures have only two modes of effects, namely protruding and recessed. Shear stress has also been utilized for tactile feedback.

BRIEF DESCRIPTION OF THE DRAWINGS

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments are not intended to limit the scope of the present invention as set forth in the appended claims. In the drawings:

DETAILED DESCRIPTION OF THE INVENTION

The exemplary embodiments described herein describe the embodiments of the system for illustrative purposes and are subject to many variations in structure. It should be emphasized, however, that the subject matter of the description is not limited to a particular system and methods of providing cutaneous feedback to a user when the user is operating a manipulandum. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The use of terms "including", "comprising", "having" and variations thereof herein are meant to encompass the items listed thereafter and equivalents thereof as well as additional items. Further, the terms, "a" and "an" herein do not denote a limitation of quantity, but rather denote the presence of at least one of the referenced item.

Certain embodiments may provide a system and method of providing cutaneous feedback to a user while the user is operating a manipulandum. The system may provide the user improved feedback regarding the operation of the manipulandum.

Certain embodiments may produce a feedback device that can provide for gradual or progressive feedback along a displacement continuum along with may allow for flexible positioning of the extremity acting on the device.

Certain embodiments may enhance a user's dexterity and sense of feel in haptic technology devices and may create a feedback system that may allow for improved feedback to a user from the manipulation of a mechanical or virtual manipulandum.

The user can be a human that may be directly operating the system or the user can include situations where the user may be indirectly (or virtually) operating the system or other automated or mechanical systems that can detect feedback.

In certain embodiments, the system may include an actuator. The actuator may exert force on the user. As an illustration, an exemplary system may be used to operate a manipulandum such as a set of robotic grippers. The use of the system for robotic grippers may be merely illustrative and other uses are possible and will be discussed further below. During operation, the system may operate to give the user feedback regarding the amount of force being exerted by the robotic grippers. The actuator may exert force onto the user in an amount relative to the force being exerted by the gripper and this force can be provided through the use of a motor or its equivalent.

Figure 1A:
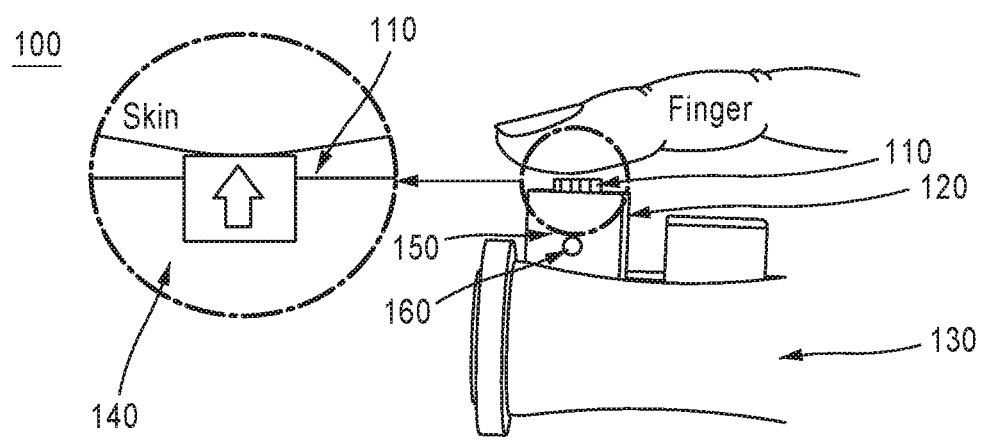
FIG. 1A illustrates a cross section of the cutaneous feedback system.

The actuator can be in the form of a pusher, a plunger, a slider, a pin, a button, or the like. The actuator can take the form of any physical object capable of exerting force against the appendage of a user. In an exemplary embodiment, the actuator may be a pusher embedded in an aperture in a button of a stylus. As the user presses the button to actuate the manipulandum, the pusher may exert a relative force normal to the user's appendage, e.g., a fingertip. In an embodiment, as illustrated in FIG. 1A, the actuator 110 may be a pusher and may be placed inside an aperture inside of a button. As the user presses a fingertip against the button, actuator 110 may press back against the user, providing cutaneous feedback to the user. In some alternatives, the range of force (torque) that can be exerted by the pusher on the fingertip may be a function of the torque a motor can produce. For example, the actuator may be able to provide a range of torque between 0-1 mNm, and more preferably from 0-0.7 mNm.

The actuator's size may be selected to provide the appropriate amount of force to the user. For example, in an embodiment where the device may be utilizing a pusher that exerts force on the fingertip of a user, the pusher must be large enough that it exerts adequate force to the user's fingertip while small enough that it could fit, for example, in the aperture of a button and still allow manipulation of the button. In an embodiment, the actuator can have a surface area of about $2\times8$ mm$^2$. Thus, the size of the actuator can be matched and optimized to the user's extremity and sensitivity so that the user can readily perceive the relative force on the manipulandum. In some alternatives, actuators with other surface area sizes may be used.

For example, in an embodiment where the actuator may be a pusher, the pusher's surface area may be sized so to provide adequate counter force against the user's finger or other extremity. In an embodiment where the actuator may be a pusher, this force can be normal to the direction of the force exerted by the finger or other extremity. It may not be necessary, however, that this force may be in the direction normal to the surface of the extremity.

FIG. 1A shows a blow up 140 of the exertion of the actuator's 110 force on the user. In an embodiment, as the user presses downward on the button 120 the actuator 110 presses directly upward in a direction normal to the surface of the user's finger. It is not necessary that the actuator's force may be directly opposing the user's force nor is it necessary that the actuator's force may be exerted perfectly normal to the user's skin. The actuator may exert any force on the user that provides for cutaneous feedback.

In an embodiment, the system includes a manipulandum connected to the actuator. As exemplified in FIG. 1B, the manipulandum may be connected to the system at 180. The manipulandum can take on many forms. For the purpose of demonstration and not to limit the application of the cutaneous feedback system, the manipulandum can include medical robotics, robotic graspers (placed horizontally, vertically, or any other direction), cutting tools, grinding tools, virtual environments (e.g., video games), writing tools, sawing tools, turning tools, industrial human-machine-interfaces, joystick control of electric wheelchairs in rehabilitation robotics, aviation devices, space devices, and the like, and combinations thereof. Furthermore, the system may be designed so that the software that controls the actuator can also be quickly adjusted to allow for quickly changing the manipulandum during operation. For example, if the system is used during a surgical procedure, the programming can quickly be altered to account for switching from a set of clamps to a set of forceps, thus giving the optimal cutaneous feedback to the user for each tool.

In an embodiment, the system includes a cam rotation system. The cam rotation system mechanically links the actuator with the control mechanisms in the device. This provides cutaneous feedback to the user by exerting a force on the user relative to force or torque exerted by a manipulandum. The cam rotation system can be in the form of gears, magnets, bevels, rollers, chains, bands, and the like as illustrated in FIGS. 8A-D. In an embodiment, as illustrated in FIG. 1A, the cam rotation system 150 may be shown connecting the actuator 110 with the connector 160.

The connector 160 is not particularly limited and may be in the form of a shaft, a cam shaft, a bar, a pillar, a cross member, gear configurations, sheaves and/or belts, and the like. In an embodiment, as illustrated in FIG. 1A, the connector 160 takes the form of a cam shaft.

Figure 1B:
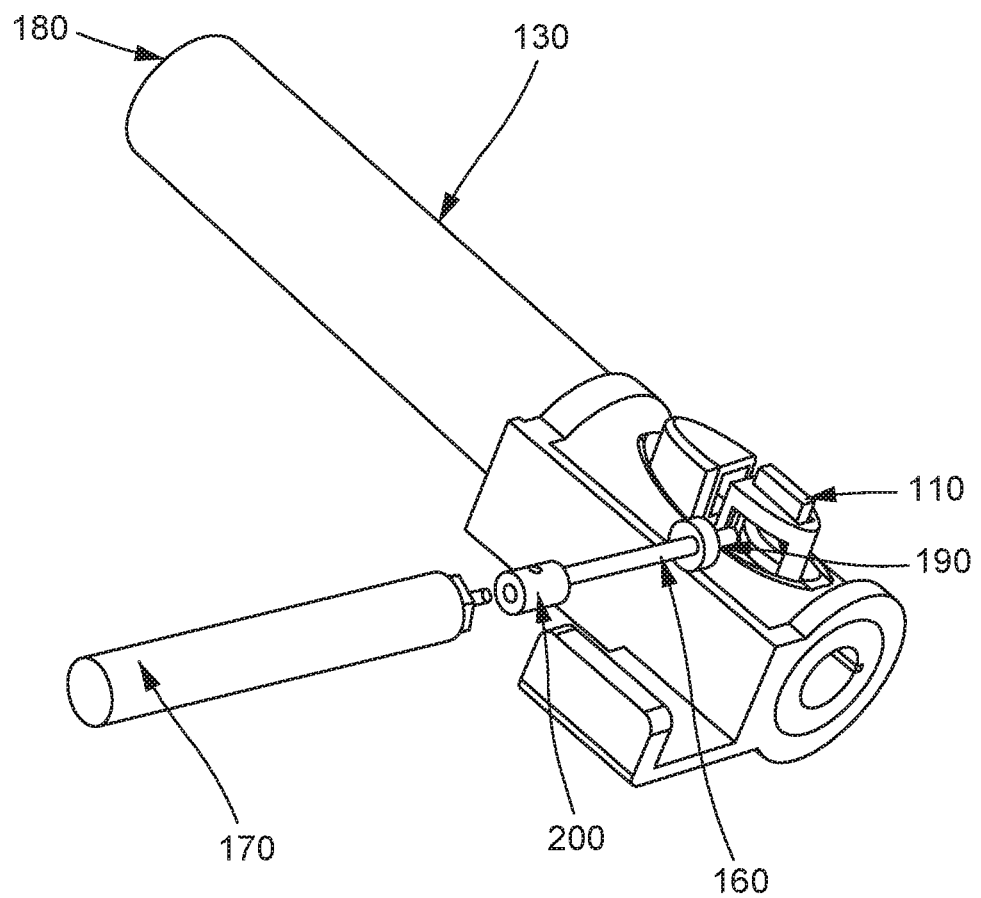
FIG. 1B illustrates a schematic view of the components of the cutaneous feedback system.

In an embodiment, the system includes a motor. The motor can be in the form of an AC, DC, sophisticated noiseless motor or any device capable of imparting force to a cam shaft that can be exerted on the actuator. In an embodiment, as illustrated in FIG. 1B, the motor 170 may be connected to the cam shaft and provides the force that may be exerted onto the actuator and the user to provide for cutaneous feedback. In an embodiment, the motor may be connected to a haptic feedback assembly that controls the output of the motor, thus, exerting the appropriate amount of force through the actuator on the user.

In an embodiment, the device includes a handle portion. As illustrated in FIG. 1, handle portion 130 may be connected to the actuator 110, and may be connected to one or more buttons 120 and other portions of the device including the manipulandum 180 and allows for a user to engage with the controls of the system. The handle portion may be any shape that allows for engagement by a user and may be considered part or the entire portion that may be engaged by the user. The handle portion can take many forms including, without limitation, a controller, joystick, a remote, a stylus, tools, keyboards, press-button switches for pneumatic device, rehabilitation equipment switch buttors, surgical haptic devices or other devices capable of human-machine interaction. In some alternatives, the pusher mechanism can be included in appliances (especially for button-type).

The engagement by a user is not particularly limited. Engagement can be virtual or through contact with the system, automated systems linked with the system, mechanical or electromechanical devices linked to the system, grasping with a user's hand, press or otherwise contacting with an extremity of the user, or the like.

In an embodiment, the system includes a linkage that connects the cam shaft to the pusher. As illustrated in FIGS. 1B and 8A-D, linkage 190 connects the cam shaft to the actuator to exert force on the user.

In an embodiment, the system includes a motor coupling. As illustrated in FIG. 1B, the motor coupling 200 connects the motor with the cam shaft. The motor coupling can take many forms including a collar, a screw, a pin, a flange, flexible couplings, rigid couplings, and the like.

In an embodiment, the system includes a haptic feedback assembly. This assembly includes a sensor, a processor, a controller or a combination of these. In an embodiment, a software system can be utilized that integrates the motor with a motor controller. Further, input from the motor controller can be linked with sensing input from the grasper in an exemplary cutaneous feedback system.

Figure 9:
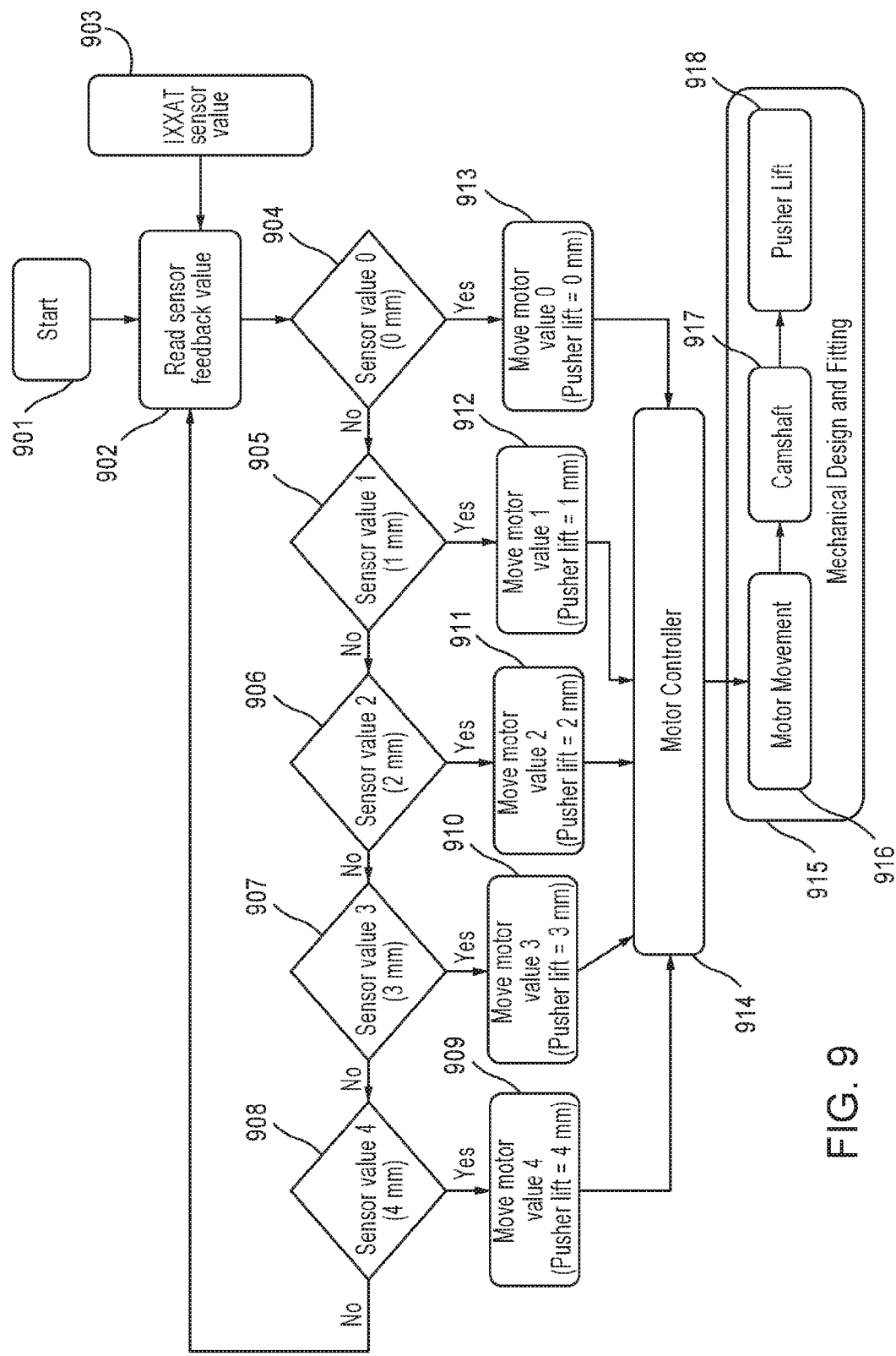
FIG. 9 illustrates an exemplary control algorithm according to one embodiment of the invention.
Figure 10A:
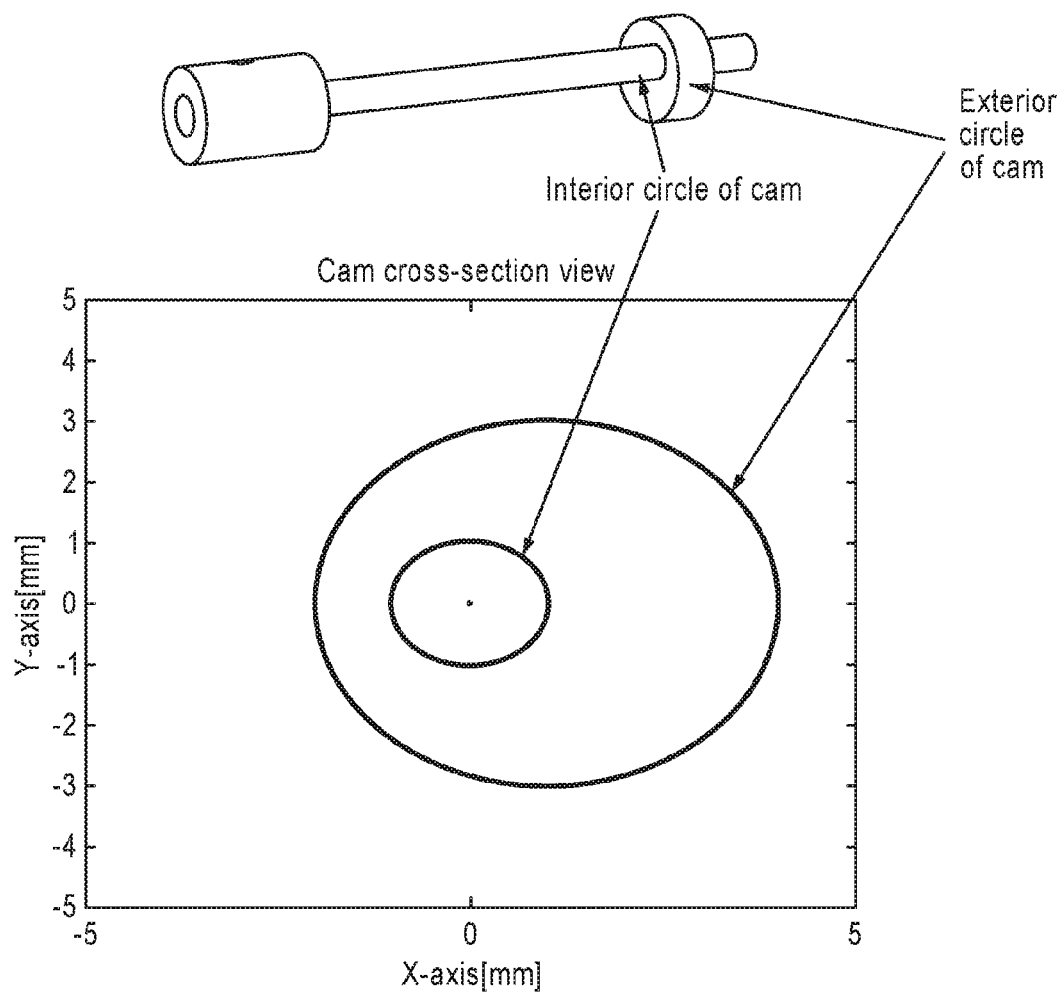
FIGS. 10A-B illustrate an exemplary configuration of the camshaft and its rotation according to one embodiment.
Figure 10B:
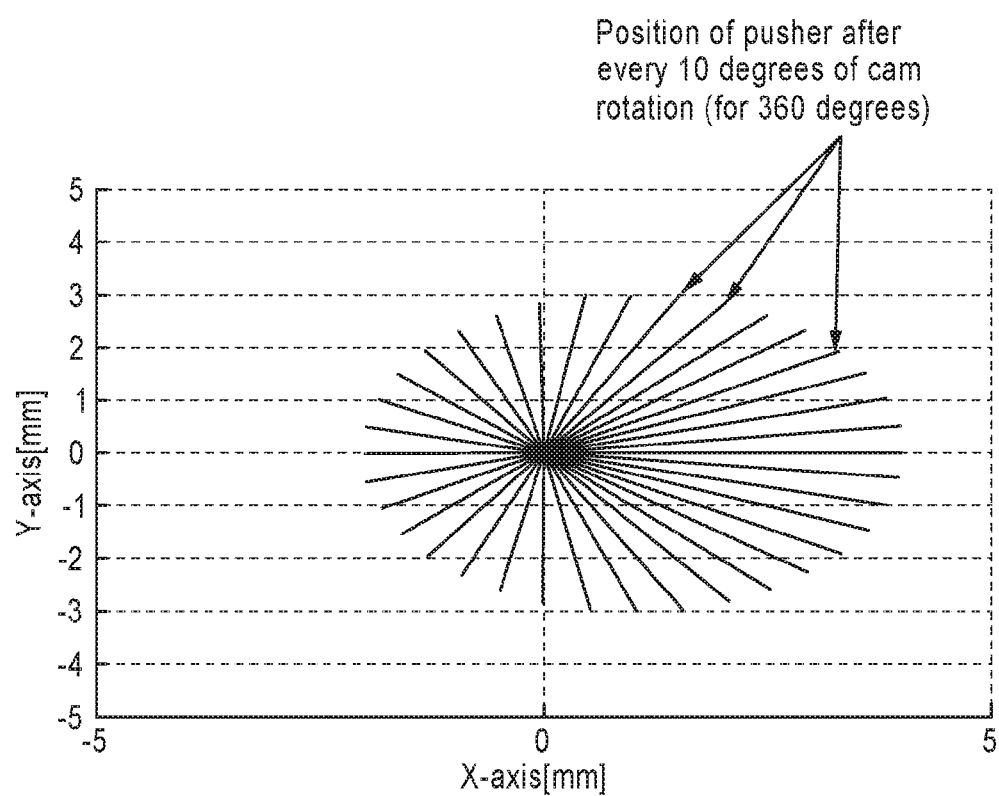

In an embodiment, feedback from the sensing input from the manipulandum may be fed to the processor using the process as illustrated in FIG. 9. In an example of the implementation of the cutaneous feedback system, this processor includes software written in C/C++ using the OpenGL framework, SensAble Omni Phantom's application programmable interfaces (APIs), motor controller APIs, or IXXAT communication USB-CAN protocol APIs, or combinations thereof. The processor may have been an Intel Core-i7 3940XM 3.0 GHz, 16.0 GB RAM, 64 Bit Windows 7 (Professional) Operating System.

The following will describe a particular implementation of the invention and is provided to serve as an example to aid in understanding of the operation of the cutaneous feedback system. The following example is not intended to serve as a limiting depiction of the present invention and is provided to demonstrate the results of operation.

In this exemplary implementation, the actuator was positioned in the aperture of a button of the Omni Phantom Stylus. The Omni Phantom Stylus was used to open or close a robotic gripper. In this example, a DC motor was used with an integrated DC motor controller and the sensing input from the grasper to form a cutaneous feedback system. The software utilized in the example was written in C/C++ using the OpenGL framework, SensAble Omni Phantom's application program interfaces (APIs), DC motor controller's APIs and IXXAT communication USB-CAN protocol APIs. For the experiment, a virtual environment was also designed in OpenGL, including a horizontally placed grasper with varied levels of virtual forces. In this virtual environment, the SensAble Omni Phantom communicated with the program through an IEEE 1394 firewire port. Instead of rendering the force through the Phantom, a proportional displacement was calculated to apply force to the user's fingertip and the force was applied using the force feedback system with a pusher positioned in an aperture of a button of the Phantom stylus.

In this implementation of the invention, the range of the pusher movement was set between 0 and 4 mm (in the software) from the starting position, to prevent the pusher movement reaching its hardware limit within the aperture in the button. The pusher's displacement may depend upon several factors, including without limitation, the camshaft's cam diameter and design, or the size of the pusher itself. Although, the pusher lift up and down may be defined by the diameter cam configurations. The invention can utilize a large range of the pusher displacement, provided the pusher housing may be large and pusher size may be large. The invention beneficially reduced the amount of backlash experienced by the user; that is, to reduce the amount of recoil experienced by the user while receiving feedback from the manipulandum. In one example, the backlash of the fingertip push was measured by moving the actuator to its entire range, while under load of a human finger and while under no load. The maximum backlash observed was than 0.01 mm. The total actuator position error based on backlash was found to be between 0% and 10%, and more preferably, from 0% to 4% of the actuator's range of motion.

Figure 2:
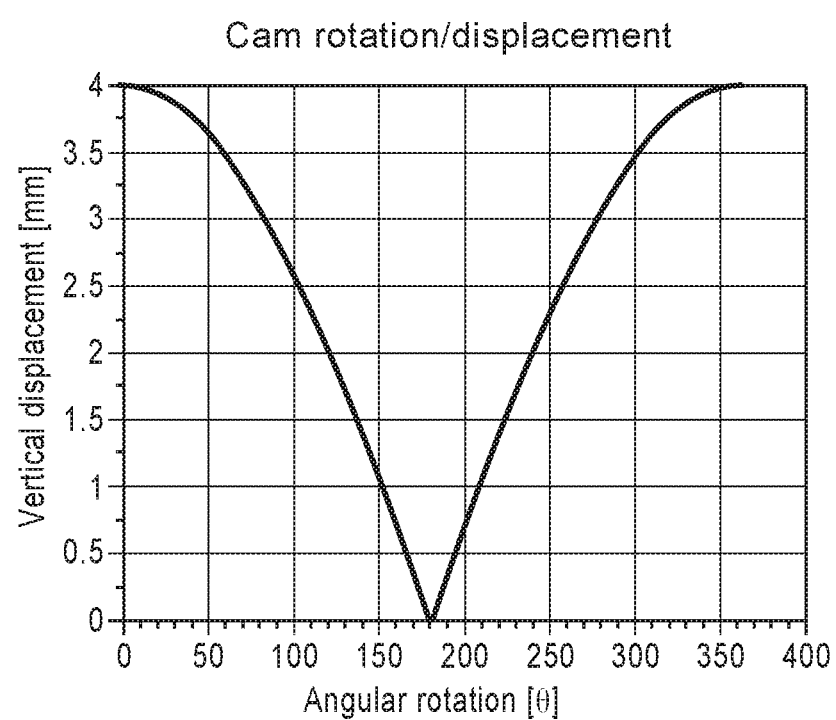
FIG. 2 is a graph of vertical displacement of an actuator vs. angular rotation of a motor in a particular embodiment.

In an embodiment, the user operates the manipulandum by pressing a button with a pusher position inside of an aperture in the button. In this embodiment, the pusher may be serving as the actuator. The relationship to determine the amount of push exerted on the fingertip of the operator may be given by the relationship:

$$F_t = kx_t \quad \text{(Eq. 1)}$$

where $F_t$ represents the grasping force applied by robotic gripper, k may be the proportionality constant, and $x_t$ may be the displacement of the actuator producing stimulus on the fingertip. The subscript, t denotes that the experimental paradigm may be discrete and maintains the last state until the next software event has occurred. A proportional-integral-derivative (PID) controller can use the encoder values from the motor and adjusts the motor angular movement to the desired position. The end point location of the actuator may be determined through a non-linear camshaft kinematic mapping. This relationship is shown graphically in FIG. 2. The relationship between the cam rotation and the pusher lift may be established through deriving distance between the point position of exterior circle with respect to the point position of inner circle. The position equation for exterior circle may be determined using Eq. 2 below:

$$\begin{bmatrix} x \\ y \end{bmatrix} = \begin{bmatrix} r\cos\theta \\ r\sin\theta \end{bmatrix} \quad \text{(Eq. 2)}$$

Where r equals 3 mm, $X_{ext}$ equals x and $Y_{ext}$ equals y. The position equation for inner circle may be determined using Eq. 2 above, where r equals 1 m, $X_{inr}$ equals x and $Y_{inr}$ equals y. The Distance formula/pusher (displacement) lift) may be calculated using Eq. 3 below.

$$\sqrt{(X_{ext} - X_{inr})^2 + (Y_{ext} - Y_{inr})^2} \quad \text{(Eq. 3)}$$

The system's upper and lower limits allow for calibration and initialization of the actuator's upper and lower limits. This allows for individualized force/pressure settings for different applications and users. The software allows for this customization. By using a programmable haptic feedback, the sense of feel can be altered and customized to fit the user defined response parameters. The calibration of the system may be required only when the pusher lift values are too small to be realized by the fingertip. In our experiments we maintained 4 different levels of pusher with 1.0 mm lift, which may be a good enough stimulus on the fingertip to realize. For other applications, the pusher lift system can be customized, according to the requirements of the application and the desired corresponding feedback stimulus. In short, the pusher lift system can be calibrated or customized to the changing needs of the applications as shown in the algorithm, by changing and adjusting the sensor values and its corresponding motor movement values.

Also, the actuator movement can be modified to match any distance of displacement. In embodiments of the invention, the displacement of the actuator would be optimized to match the displacement of the controlling mechanism of the manipulandum. For example, in an embodiment where the actuator may be a pusher located in an aperture of a button, the pusher's travel would be matched and optimized relative to the button's displacement so that the user would experience variable amounts of force from the pusher relative to the displacement the user places on the button. Using the arrangement of this particular embodiment, the following trial was conducted. The pusher lift displacement can be determined by the cam design equations. In our case the equations as mentioned above are used to determine the pusher lift (displacement). Our method can be incorporated into any joystick type interface or any other form of pusher lift mechanisms for human-computer interaction devices.

Figure 3:
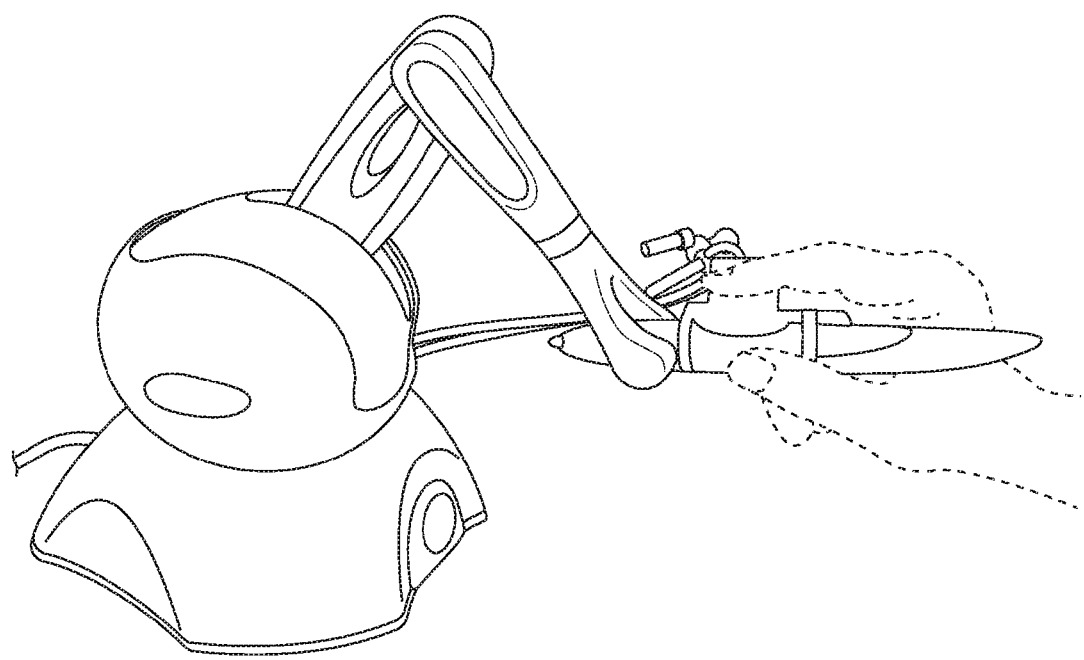
FIG. 3 illustrates a user's engagement with a particular embodiment of the system.

A total of seven healthy subjects participated in the experimental trials and none of them reported any deficiencies in the perception abilities (including vision, hearing, touch, and proprioception). Two types of experiments were conducted: pre-trials and main trials. The purpose of the pre-trial was to train the subject's perception to fingertip push stimuli. The purpose of the main trial was to determine the ability of subjects to discriminate between different levels of force stiffness through fingertip push mechanism feedback while probing the soft tissue. The tactile fingertip force feedback device was attached to the physical end of the SensAble Omni Phantom haptic device, and subjects were instructed to hold the device in a manner they hold the stylus. In this experimental implementation, the subjects were told to hold the stylus just like holding a pen, with their index fingers placed over the buttons covering the aperture as shown in FIG. 3.

The purpose of these pre-trials was to determine, whether or not subjects interpreted the varying levels of stimulus against the fingertip as representative of varying levels of forces at the gripper. Each subject held the stylus with their index finger and were also given explanation of the haptic scenario. Subjects were evaluated on how they interpreted the relationship between the stimulus and force using a subjective assessment protocol that employed the method of varying stimuli as a function of the varying forces. Subjects were introduced to the stimulus containing a reference (usually 0.1 N force) and comparison stimulus. The reference fingertip stimulus was based on a grasping proportionality constant of 0.1 N/mm. The fingertip stimuli were based on the force values of 0.0, 0.1, 0.2, 0.3, 0.4 N, and 0.5 N with a pusher displacement levels of 0, 0.5, 1, 2, 3, 4 mm. A total of 8 trials were completed, for each of the 4 comparison fingertip stimulus values.

After getting the exposure to the system in pre-trials, subjects started real-time experiments of tissue manipulation using a RAVEN-II surgical robot on the interpretation of fingertip feedback stimulus. In these experiments, subjects wore 3D imaging goggles, sat in front of a monitor visualizing the robotic grasper, while holding the Omni Phantom's stylus. 3D goggles/glasses are used to watch a standard 3D monitor. They block the light from the right eye while the monitor shows an image for the left eye and vice versa. The monitor has to show separate images for the left and right eye at a high rate (usually between 80 and 160 Hz). This technique is called "time sequential stereo". 3D goggles are often referred to as 3D monitor glasses, they are just a shutter (light blocker) for each eye. Subjects were told to use a pen-based stylus to press on two buttons (the front button for closing and rear button for opening the grasper) while feeling the effect on their fingertips. The subjects were also explained that manipulation of soft object with the stylus would cause abrupt stimulus and were asked to maintain the grip sufficient to hold the soft object, to avoid any high stimuli. Then, to familiarize the user with the fingertip stimulus stylus, they were presented with two different levels of forces, e.g., a medium force of 0.4 N and a high force 0.525 N to allow for initialization of the system and to familiarize the subjects with the feeling of the pusher. Range of initialization values depend upon the range of initial sensor values. In our patent application we assume that we know the initial sensor values, although the corresponding pusher lift values can be adjusted accordingly. In short, the initialization values could be very small or very large, does not make any difference, as long as we know the sensor input values. Subjects were also introduced to the two equivalent push stimuli as a consequence of the respective forces, with $k=0.1$ N/mm.

The performance of the feedback device was evaluated as to how good the users discriminated between the different levels of the push stimulus corresponding to the varying levels of forces. Statistical analysis was performed using the Matlab 'anova2' and 'ttest' functions. Repeated-measures of two-way analysis of variance (ANOVA) were performed to compare the different levels of pusher across different force feedback values. The Kolmogorov-Smirnov was used test for the normality of the data. A paired sample t-test was performed to compare the performance between 1st level and 2nd level, 3rd level and 4th level and finally 4th and 5th level force-to-pusher feedback.

Figure 4:
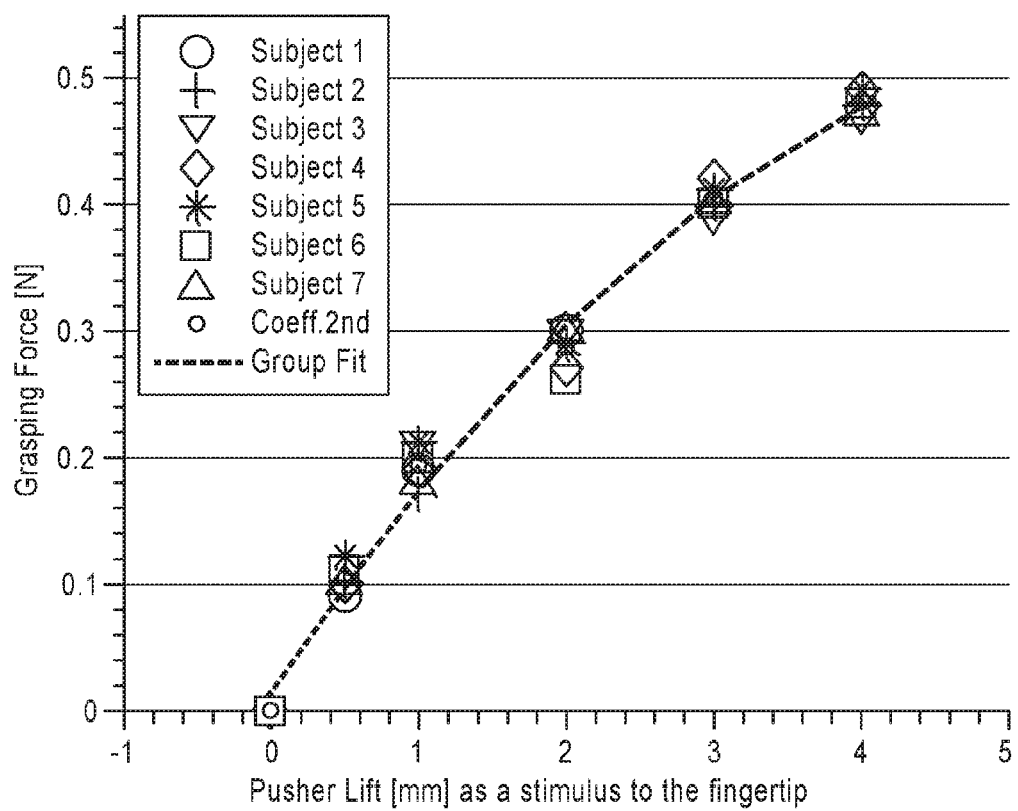
FIG. 4 illustrates testing results from a particular embodiment of the present invention and shows the relationship of the grasping force of a pair of robotic grippers as a function of the actuator's displacement in the system.
Figure 5:
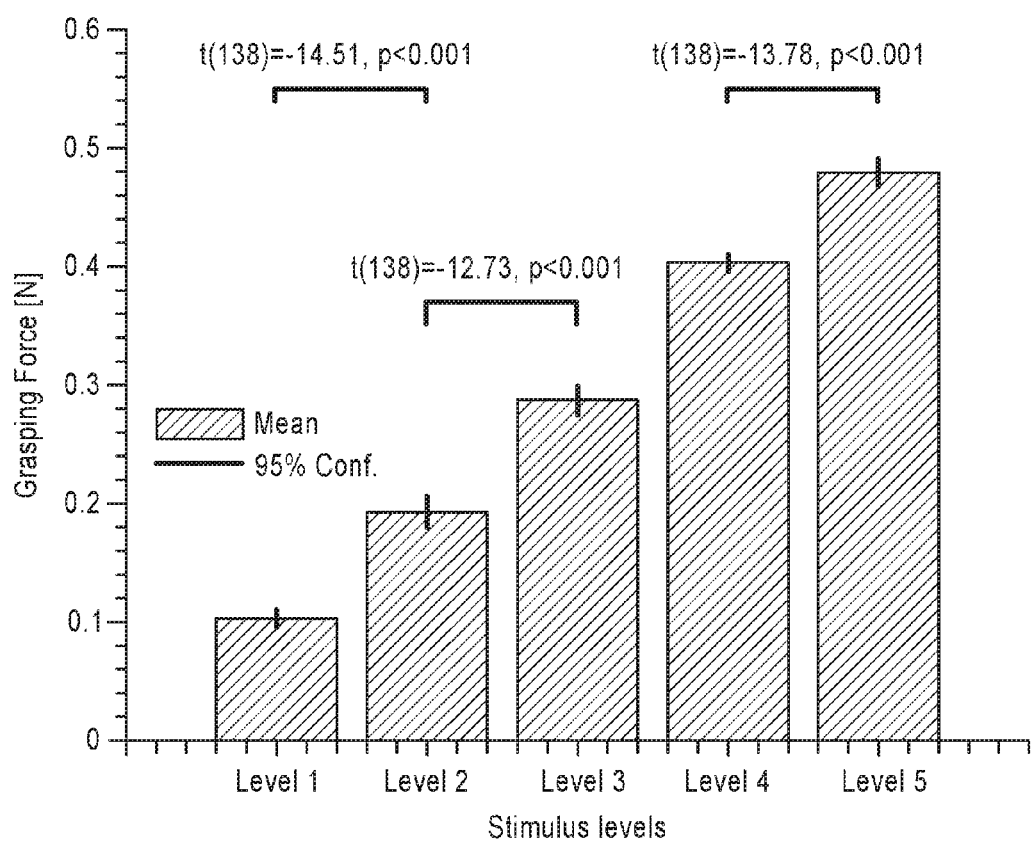
FIG. 5 illustrates the significance of the results from testing a particular embodiment of the present invention.

Each subject's results as a response to pre-trials are summarized in FIG. 4. In this experiment, subjects attempted to identify the amount of force at the grasper's end by identifying the correct displacement stimuli delivered by pusher through the cam-shaft mechanism, with no training on interpretation of the cues. An ANOVA on accuracy deviation scores showed stimulus distance to have an ascertainable effect as [Pusher Stimulus: $F(1,138)=1283.56$, $p<0.0001$]. The p value for the pusher stimulus effect may be zero to four decimal places. This may be a strong indication that the feedback forces discriminated by the subjects varies from one pusher level to another. Thus, the system's ability to be easily customized may be highly advantageous. Force statistics shows that the observed force would occur by chance less than once in 10,000 times if the force discriminations were truly equal from one level to another level. The ANOVA statistics across one trial to another are $[F(1,138)=1.57, p<0.093]$, the p value for the trial to trial effect may be 0.093, which may also be highly significant. This indicates that one trial may not be out-performing the other in the discrimination of forces (given the users have no prior experience of the device use). The p value, 0.2852, means that the observed result may be quite likely (28 out 100 times) given that there may be no interaction. The significance of these results was confirmed with subsequent t-tests as shown in FIG. 5.

Figure 6:
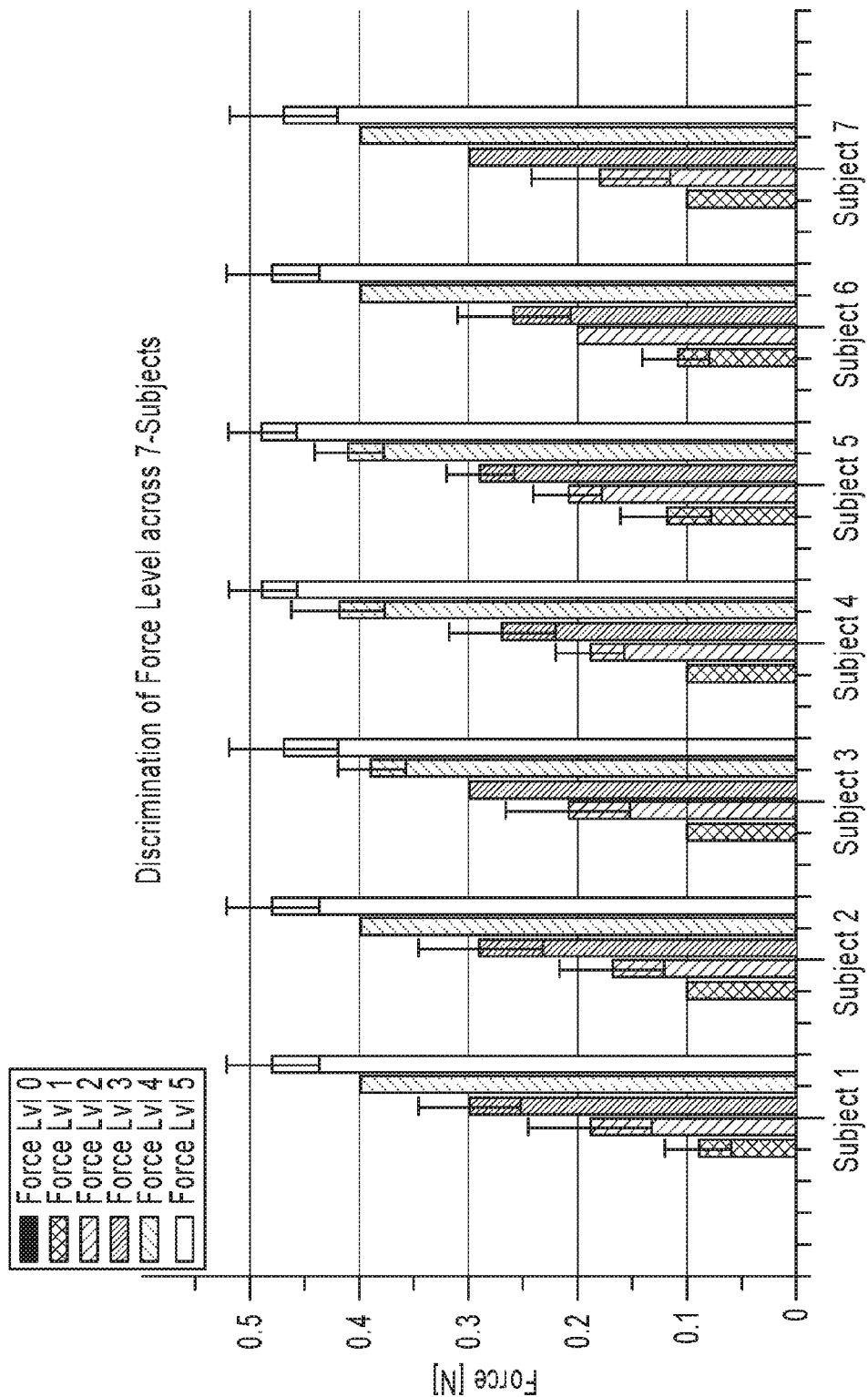
FIG. 6 illustrates the force results observed when experimenting with a particular embodiment of the invention across seven experimental users.

FIG. 4. Shows the participants' untrained response to pusher feedback from pre-test. Individual points represent the force proportion answered by each subject. In FIG. 4, a line curve may be plotted using the combined data of the participants. The individual data and the line curve indicate that subjects perceived higher force perception relative to higher force experienced by the gripper. FIG. 4. shows mean performance metrics and shows the mean grasping force averaged across all subjects. The error bars indicate 95% confidence intervals for both the grasping force and time. FIG. 6 shows the mean force level values across all the subjects and the errorbars illustrate the standard deviation of the force levels.

Figure 7A:
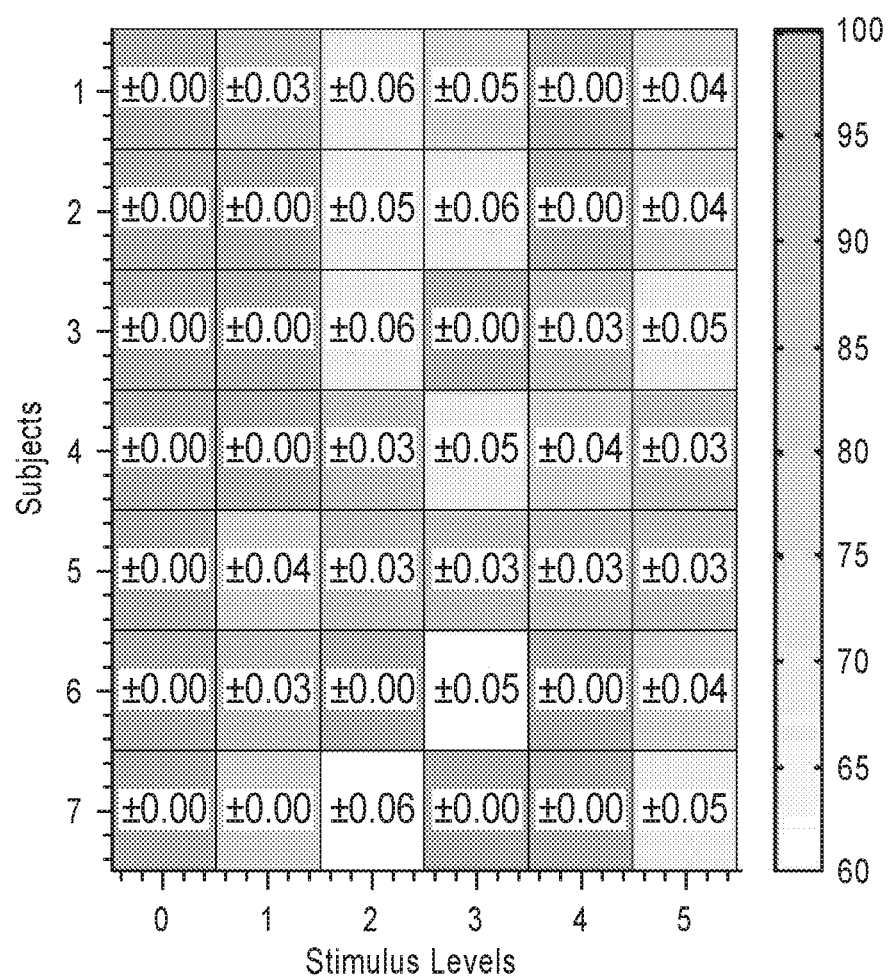
FIGS. 7A-B illustrates the analysis of the significance of the data observed when testing a particular embodiment of the device using seven experimental users.
Figure 7B:
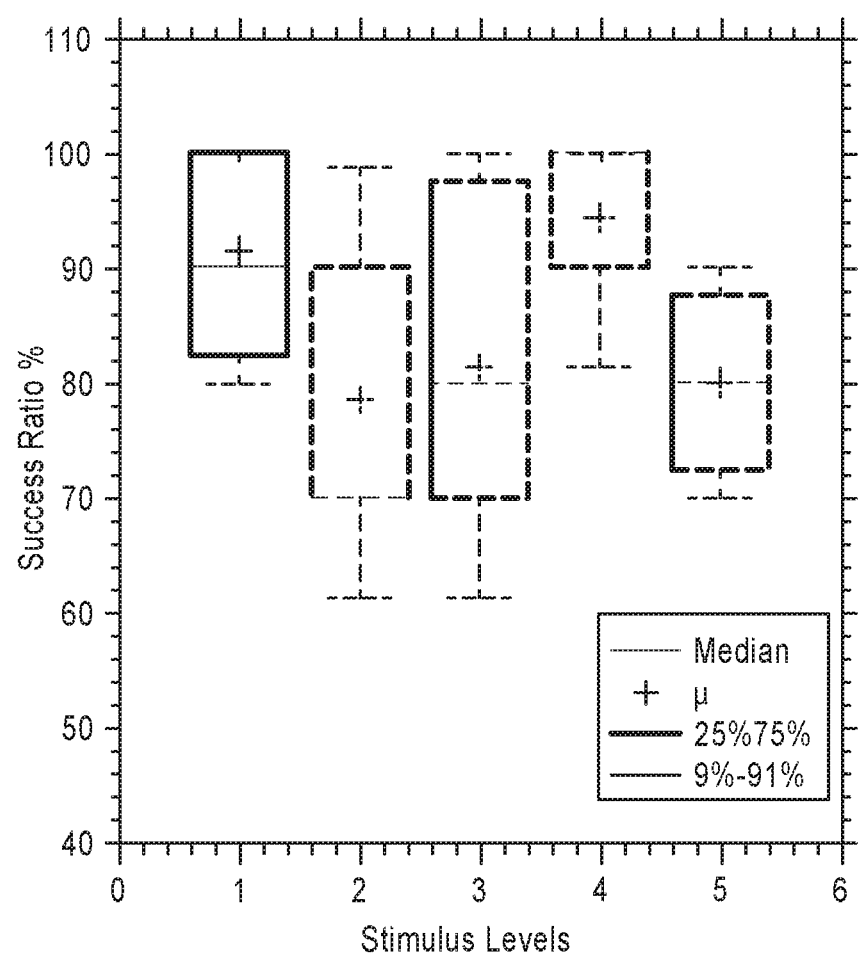
Figure 8A:
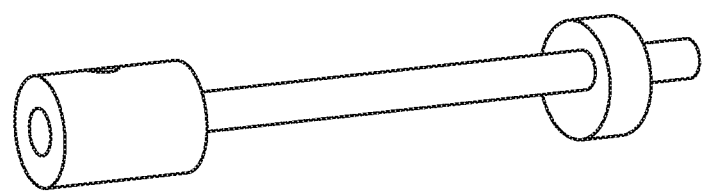
FIGS. 8A-D Illustrate exemplary configurations of the camshaft mechanism according to an embodiment.
Figure 8B:
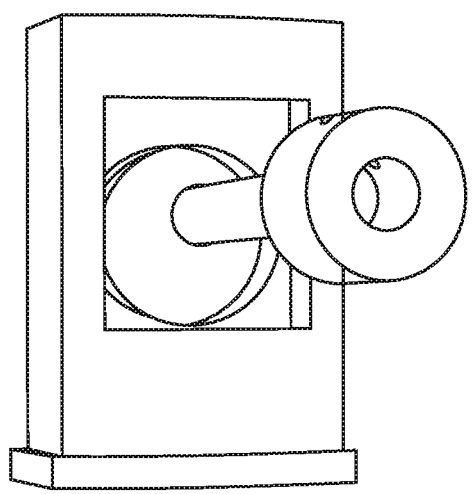
Figure 8C:
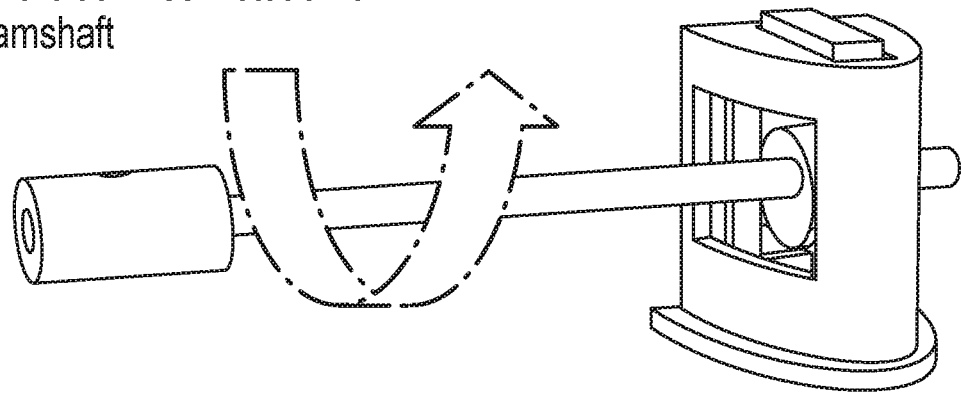
Figure 8D:
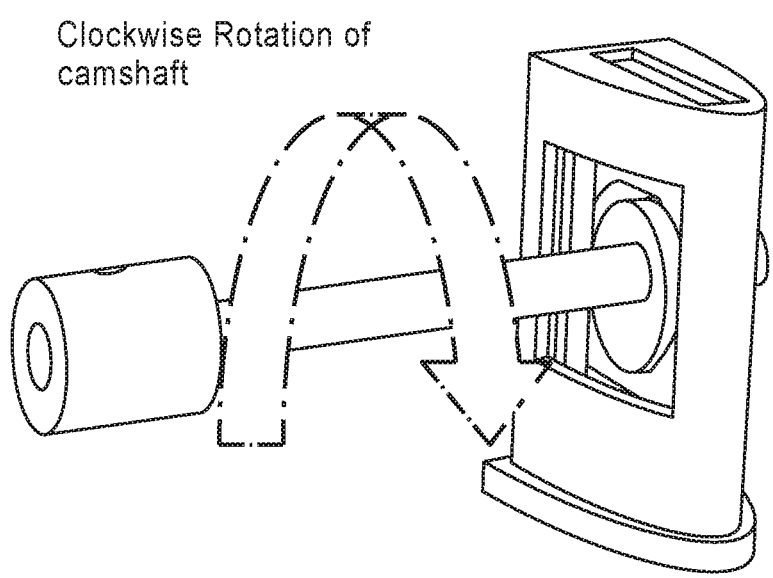

FIG. 7A shows the performance matrix for the force discrimination test using index-finger/pusher interaction with response errors in mm. Each cell contains the total percentage of stimuli perceived as a function of the actual rendered force. FIG. 7B shows the success rate of the force discrimination test with each box plot representing the level of stimulus.

Results suggest that force feedback features can be improved using pusher type mechanism normal to the fingertip direction although the objects of the invention are satisfied with any direction of force. The normal directional fingertip push may be mediated primarily through a combination of 'rapidly adapting' mechanoreceptors and 'slowly adapting' mechanoreceptors of the fingertip (or any extremity). Therefore, utilizing the normal direction features moving and pressing against the skin and excites additional 'rapidly adapting' mechanoreceptors, making the stimulus theoretically more important to the operation of the device. According to the literature and previous research experiments conducted with varying sizes of tactors, showed that size of the tactor did not critically impact direction perception, and thus, the size of the actuator can be customized to the individual application and user of the system.

In some alternatives, the effect of stimulus on accuracy of force discriminant may show some bias, for example, in the medial levels of pushers (e.g. between the medial levels namely third). FIGS. 7A and 7B show performance matrices, summarizing subject performance of force discrimination through various stimuli. When the subjects perceived the medial stimuli with the index finger, they were biased in the medial position, responding most frequently, for example, at the one less or one higher level. In cases where stimuli were proximal/distal, subjects showed no clear pattern of confusion. Incorrect responses were subject to the same medial bias as correct responses, but were otherwise distributed randomly across all directions. The effect of stimulus in medial and distal level through postural perspective was observed. For example, when subjects placed their index fingers over the button aperture, their palms remained parallel to the ground and their index finger was aligned with their forearm, but in order to receive the distal stimulus, their index finger was inclined to a level where the palm was no more aligned with the forearm and studies related to perception have shown that haptic perception of orientation may be influenced by the orientation of the hand. Since the stimulus on the user is readily customizable and adjustable by the system, the alignment of the stimulus and the effect on the user can be optimized. Thus, it is an object of the invention to give beneficial cutaneous feedback that is customized to the application and the dexterity desired by the user.

"Normal" takes on the geometric meaning of the word, and can mean that the force is perpendicular or nearly perpendicular to a plane.

"Handle" takes on the meaning of the part by which a thing is held, carried, or controlled and is not intended to limit the engagement of the user with the system to the user's hands. It is within the scope of the invention that the cutaneous feedback system could be utilized with extremities other than hands.

"Cutaneous" takes on the meaning any interaction capable of being felt by a user's skin.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but not necessarily, refer to the same embodiment.

The invention claimed is:

1. A haptic feedback system comprising:
an actuator that exerts a normal indenting force to a user's fingers when engaging the actuator;
a cam rotation system connected to a pusher device, wherein the cam rotation system comprises:
a linkage, and
a connector coupled to the linkage;
a motor coupled to the cam rotation system that provides cutaneous feedback to the user via the actuator;
a sensor, a processor, a controller, and memory including computer program code; and
a handle portion, wherein the actuator is positioned within the handle portion,
wherein the actuator is positioned in an aperture of a button positioned on the handle portion, and
wherein the memory and the computer program code are configured to, with the processor, cause the haptic feedback system at least to
change and adjust sensor values and corresponding movements of the motor depending on an application of the haptic feedback system,
modify movements of the actuator to match any distance of displacement of the button, and
create different patterns of the normal indenting force to the user's fingers based on the application of the haptic feedback system.

2. The system of claim 1, wherein the handle portion is a stylus and the actuator is a pusher positioned axially within the stylus to exert force normal to the user.

3. The system of claim 1, wherein the actuator has a movement range of about 0 mm to 5 mm.

4. The system of claim 1, wherein the actuator has a surface area of about 2×8 mm2 to 2.5×8 mm2.

5. The system of claim 1, wherein the connector is a camshaft.

6. The system of claim 1, wherein the motor is a DC motor.

7. The system of claim 1, further comprising a manipulandum connected to the actuator.

8. The system of claim 7, wherein the manipulandum is chosen from a medical robot, robotic graspers, a cutting tool, a grinding tool, a virtual environment, a writing tool, a sawing tool, a turning tool, an industrial human-machine-interface, a joystick control of an electric wheelchair, an aviation device, a space device, and combinations thereof.

9. The system of claim 7, wherein the manipulandum is a robotic grasper.

10. The system of claim 1, further comprising 3D imaging goggles and a monitor.

11. The system of claim 1, wherein a backlash is based on the actuator size.

12. The system of claim 11, wherein the backlash is 0 mm to 0.01 mm.

13. A method of operating a haptic feedback system, the method comprising:
providing a force via a system;
wherein the system comprises:
an actuator that exerts normal indenting force to a user's fingers;
a cam rotation system connected to the actuator, wherein the cam rotation system comprises:
a linkage, and
a connector coupled to the linkage;
a motor coupled to the cam rotation system that provides cutaneous feedback; and
a handle portion, wherein the actuator is positioned within the handle portion, and wherein the actuator is positioned in an aperture of a button positioned on the handle portion;
changing and adjusting sensor values and corresponding movements of the motor depending on an application of the haptic feedback system;
modifying movements of the actuator to match any distance of displacement of the button; and
creating different patterns of the normal indenting force to the user's fingers based on the application of the haptic feedback system.

14. The method of claim 13, wherein the method further comprises:
receiving feedback from a sensor;
processing the feedback from the sensor; and
controlling the exertion of force to the user based on the feedback.

15. The method of claim 13, wherein the handle portion is a stylus and the actuator is a pusher positioned axially within the stylus to exert force normal to the user.

16. The method of claim 13, further comprising a manipulandum connected to the actuator.

17. The method of claim 16, wherein the manipulandum is chosen from a medical robot, robotic graspers, a cutting tool, a grinding tool, a virtual environment, a writing tool, a sawing tool, a turning tool, an industrial human-machine-interface, a joystick control of an electric wheelchair, an aviation device, a space device, and combinations thereof.

18. The method of claim 17, wherein the manipulandum is a robotic grasper.

19. The method of claim 13, further comprising 3D imaging goggles and a monitor.

* * * * *